US012325479B2

(12) United States Patent
Shikanai et al.

(10) Patent No.: US 12,325,479 B2
(45) Date of Patent: Jun. 10, 2025

(54) SADDLED VEHICLE WITH UNOBTRUSIVE AIR GUIDE MOUNTING

(71) Applicant: Honda Motor Co., Ltd., Tokyo (JP)

(72) Inventors: Shimpei Shikanai, Tokyo (JP); Yuichiro Kurose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 17/966,070

(22) Filed: Oct. 14, 2022

(65) Prior Publication Data

US 2023/0202602 A1    Jun. 29, 2023

(30) Foreign Application Priority Data

Dec. 28, 2021   (JP) .................. 2021-215077

(51) Int. Cl.
*B62J 17/10*     (2020.01)
*B62J 17/02*     (2006.01)

(52) U.S. Cl.
CPC ............ *B62J 17/10* (2020.02); *B62J 17/02* (2013.01)

(58) Field of Classification Search
CPC ............ B62J 17/10; B62J 17/02; B62J 17/04
See application file for complete search history.

(56) References Cited

U.S. PATENT DOCUMENTS

| 2012/0043150 A1* | 2/2012 | Miyazaki | B62J 17/02 |
| | | | 180/219 |
| 2016/0090144 A1* | 3/2016 | Shimizu | B62J 17/02 |
| | | | 296/180.1 |
| 2018/0093731 A1 | 4/2018 | Nakayama et al. | |
| 2019/0300090 A1 | 10/2019 | Yokokawa et al. | |

FOREIGN PATENT DOCUMENTS

| DE | 20 2020 103 755 U1 | 8/2020 |
| EP | 3 418 168 A1 | 12/2018 |
| EP | 3 636 525 A1 | 4/2020 |

(Continued)

OTHER PUBLICATIONS

German Office Action for corresponding German Application No. 102022128453.0, dated Sep. 5, 2023, with English translation.

(Continued)

*Primary Examiner* — Daniel J Colilla

(74) *Attorney, Agent, or Firm* — Birch, Stewart, Kolasch & Birch, LLP

(57) ABSTRACT

To provide a saddled vehicle having air guide members firmly yet readily mounted on its front cowl while keeping the mounting portion unobtrusive.

A saddled vehicle includes: a cowl that covers a front part of the saddled vehicle; a windshield screen disposed at an upper part of the cowl; and an air guide member separately from the windshield screen mounted on the cowl. The cowl includes a front cowl that covers an outer circumference of a headlamp and a front lateral cowl that covers an outer side in the vehicle width direction of the front cowl. The air guide member includes a support part held between front cowl and the front lateral cowl. The front cowl has an opening. The support part is inserted into the opening from the outer side in the vehicle width direction. The opening and the support part are covered with the front lateral cowl.

18 Claims, 15 Drawing Sheets

(56) References Cited

FOREIGN PATENT DOCUMENTS

| | | |
|---|---|---|
| JP | 4-52990 A | 5/1992 |
| JP | 6-156348 A | 6/1994 |
| JP | 2009-202803 A | 9/2009 |
| JP | 2019-177835 A | 10/2019 |
| JP | 2021155026 A * | 10/2021 |
| WO | WO 2018/225199 A1 | 12/2018 |

OTHER PUBLICATIONS

Japanese Office Action for corresponding Japanese Application No. 2021-215077, dated Sep. 12, 2023, with English translation.

* cited by examiner

SADDLED VEHICLE WITH UNOBTRUSIVE AIR GUIDE MOUNTING

BACKGROUND

1. Technical Field

The present invention relates to a saddled vehicle, particularly to a saddled vehicle including: a front cowl that holds a headlamp and a windshield screen; and air guide members, separately from the windshield screen, mounted on the front cowl.

2. Description of the Background

A conventionally known saddled vehicle includes: a front cowl that holds a headlamp and a windshield screen; and air guide members, separately from the windshield screen, mounted on the front cowl.

Patent Literature 1 discloses a saddled vehicle including: a front cowl that holds a headlamp and a windshield screen; and a right-left pair of plate-like air guide members mounted on the front cowl beside the windshield screen disposed at the center in the vehicle width direction.

CITATION LIST

Patent Literature

Patent Literature 1: WO 2018/225199

BRIEF SUMMARY

Here, in Patent Literature 1, while the air guide member is firmly yet readily mounted on the front cowl using a bolt, the mounting portion being exposed to the outside impairs the appearance.

An object of the present invention is to solve the problem, and to provide a saddled vehicle having air guide member firmly yet readily mounted on its front cowl while keeping the mounting portion unobtrusive.

In order to achieve the object, a first aspect of the present invention provides a saddled vehicle (1) including: a cowl (C) that covers a front part of the saddled vehicle (1); a windshield screen (7) disposed at an upper part of the cowl (C); and an air guide member (50) separately from the windshield screen (7) mounted on the cowl (C). The cowl (C) includes a front cowl (9) that covers an outer circumference of a headlamp (12) and a front lateral cowl (11) that covers an outer side in the vehicle width direction of the front cowl (9). The air guide member (50) includes a support part (52) held between the front cowl (9) and the front lateral cowl (11).

In a second aspect, the front cowl (9) has an opening (9a). The support part (52) is inserted into the opening (9a) from an outer side in the vehicle width direction. The opening (9a) and the support part (52) are covered with the front lateral cowl (11).

In a third aspect, a vehicle widthwise dimension of the support part (52) is longer than a distance between the front cowl (9) and the front lateral cowl (11).

In a fourth aspect, the front cowl (9) includes, at its portion covered with the front lateral cowl (11), a bent part (9b) that extends outward in the vehicle width direction. The bent part (9b) includes a downward extending part (9c) that extends downward along a back surface of the front lateral cowl (11) from its outer end in the vehicle width direction. The opening (9a) is provided at the downward extending part (9c).

In a fifth aspect, the air guide member (50) includes: a base part (53) that extends along a surface of the front cowl (9); an outward extending part (54) that extends outward in the vehicle width direction along the bent part (9b); and a lower part (55) that extends downward from an end of the outward extending part (54) along a back surface of the front lateral cowl (11). The support part (52) extends inward in the vehicle width direction from a lower end of the lower part (55).

In a sixth aspect, the air guide member (50) is disposed at a site where a contour of the front cowl (9) and a contour of the front lateral cowl (11) cross each other at a predetermined angle in a front view of the saddled vehicle (1).

In a seventh aspect, the front cowl (9) is inclined to widen outward in the vehicle width direction toward its rear. The air guide member (50) includes a rearward extending part (57) that extends rearward than a rear end of the front cowl (9). The rearward extending part (57) is inclined outward in the vehicle width direction greater than the front cowl (9) is.

In an eighth aspect, an inner surface of the base part (53) of the air guide member (50) is bonded to an outer surface of the front cowl (9).

In a ninth aspect, the base part (53) is textured.

In a tenth aspect, a right-left pair of the air guide members (50) is provided, and held between the front cowl (9) and the front lateral cowl (11).

According to the first aspect, a saddled vehicle (1) includes: a cowl (C) that covers a front part of the saddled vehicle (1); a windshield screen (7) disposed at an upper part of the cowl (C); and an air guide member (50) separately from the windshield screen (7) mounted on the cowl (C). The cowl (C) includes a front cowl (9) that covers an outer circumference of a headlamp (12) and a front lateral cowl (11) that covers an outer side in a vehicle width direction of the front cowl (9). The air guide member (50) includes a support part (52) held between the front cowl (9) and the front lateral cowl (11). Thus, the air guide member is held between the front cowl and the front lateral cowl, that is, easily assembled. The support part not being exposed to the outside improves the appearance.

According to the second aspect, the front cowl (9) has an opening (9a). The support part (52) is inserted into the opening (9a) from an outer side in a vehicle width direction. The opening (9a) and the support part (52) are covered with the front lateral cowl (11). Thus, by the support part being inserted into the opening and covered with the front lateral cowl, the air guide member is easily positioned and held.

According to the third aspect, a vehicle widthwise dimension of the support part (52) is longer than a distance between the front cowl (9) and the front lateral cowl (11). Thus, unless the front lateral cowl is removed, the support part will not come off from the opening, and the front cowl and the front lateral cowl surely hold the air guide member.

According to the fourth aspect, the front cowl (9) includes, at its portion covered with the front lateral cowl (11), a bent part (9b) that extends outward in the vehicle width direction. The bent part (9b) includes a downward extending part (9c) that extends downward along a back surface of the front lateral cowl (11) from its outer end in the vehicle width direction. The opening (9a) is provided at the downward extending part (9c). This structure reliably provides the space for mounting the air guide member and facilitates positioning the air guide member.

According to the fifth aspect, the air guide member (50) includes: a base part (53) that extends along a surface of the front cowl (9); an outward extending part (54) that extends outward in the vehicle width direction along the bent part (9b); and a lower part (55) that extends downward from an end of the outward extending part (54) along a back surface of the front lateral cowl (11). The support part (52) extends inward in the vehicle width direction from a lower end of the lower part (55). Thus, the air guide member has the shape that conforms to the front cowl and the front lateral cowl, which further facilitates positioning the air guide member.

According to the sixth aspect, the air guide member (50) is disposed at a site where a contour of the front cowl (9) and a contour of the front lateral cowl (11) cross each other at a predetermined angle in a front view of the saddled vehicle (1). Thus, the air guide member being disposed in the passage of the airflow flowing along the shape of the cowl reduces the airflow's impact on the rider.

According to the seventh aspect, the front cowl (9) is inclined to widen outward in the vehicle width direction toward its rear. The air guide member (50) includes a rearward extending part (57) that extends rearward than a rear end of the front cowl (9). The rearward extending part (57) is inclined outward in the vehicle width direction greater than the front cowl (9) is. This structure guides the airflow flowing along the front cowl increasingly outward in the vehicle width direction and reduces the airflow's impact on the rider.

According to the eighth aspect, an inner surface of the base part (53) of the air guide member (50) is bonded to an outer surface of the front cowl (9). Thus, in conjunction with the support part, the air guide member is further surely fixed to the cowl.

According to the ninth aspect, the base part (53) is textured. The texturing makes the bonded portion unobtrusive and improves the appearance of the air guide member.

According to the tenth aspect, a right-left pair of the air guide members (50) is provided, and held between the front cowl (9) and the front lateral cowl (11). The right-left pair of air guide members attains a compact design and easy assembly.

DETAILED DESCRIPTION

Figure 1:
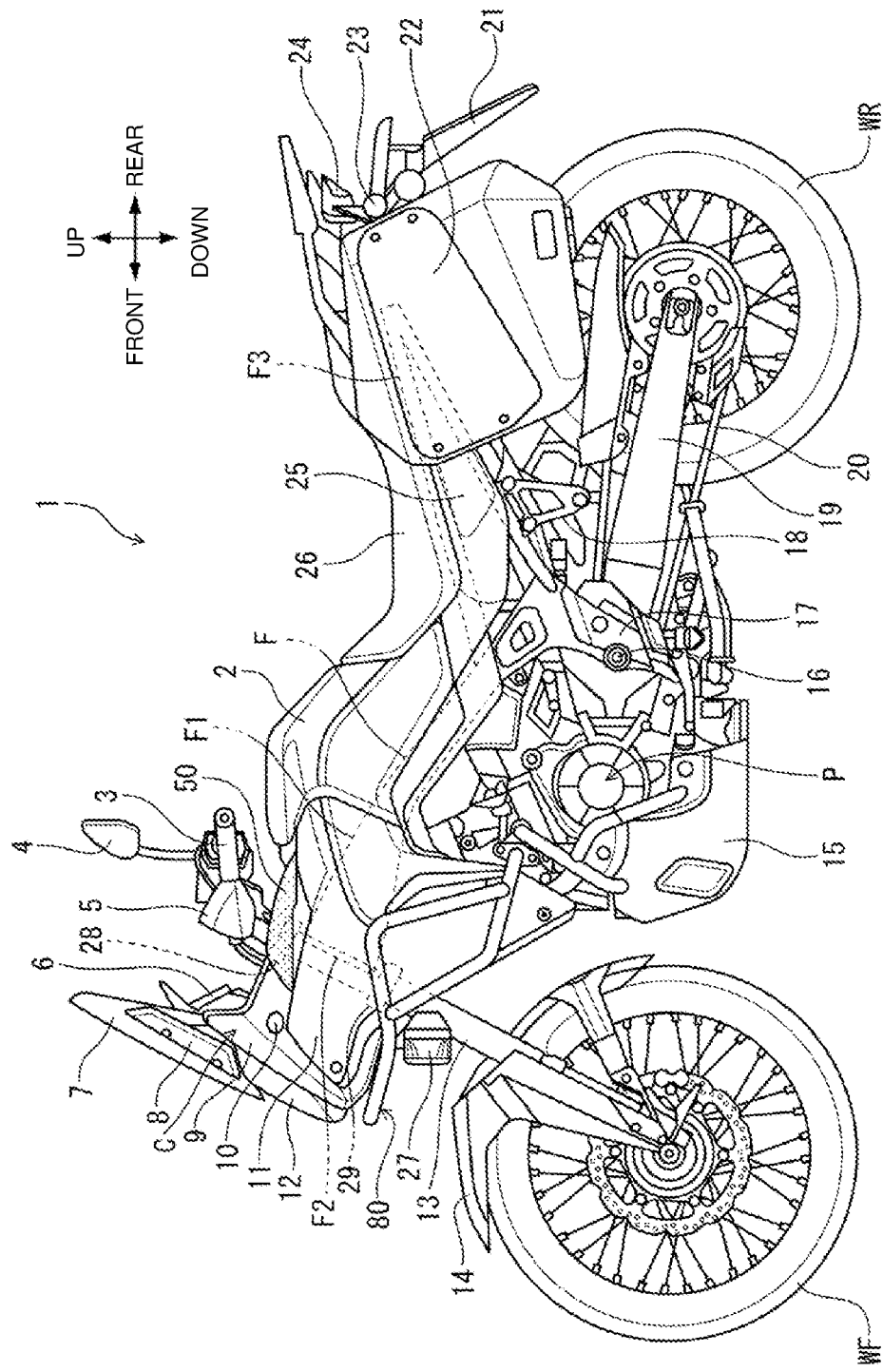
FIG. 1 is a left-side view of a motorcycle according to one embodiment of the present invention.

In the following, with reference to the drawings, a detailed description will be given of a preferred embodiment of the present invention. FIG. 1 is a left-side view of a motorcycle 1 according to one embodiment of the present invention. The motorcycle 1 is a saddled vehicle that travels by drive transmitted from a power unit P to a rear wheel WR. At the front end of a main frame F1 that forms a vehicle body frame F, a head pipe F2 is provided to swingably hold a not-shown steering stem.

At the top and bottom of the steering stem, a top bridge 28 and a bottom bridge 29 are respectively fixed to hold a right-left pair of front forks 13. The front forks 13 rotatably hold a front wheel WF by their lower ends.

The main frame F1 has its rear end lower part coupled to a pivot frame 17 that includes a pivot frame 16 that swingably holds a swingarm 19. By its rear end, the swingarm 19 rotatably holds a rear wheel WR as the drive wheel. The pivot frame 17 has its upper part coupled to a rear frame F3 that holds a seat 26 and a rear cowl 25.

A fuel tank 2 is disposed at the upper part of the main frame F1. A power unit P is suspended from the lower part of the main frame F1. The drive of the power unit P is transmitted to the rear wheel WR via a drive chain 20.

A steering handlebar 3 is fixed to the upper part of the top bridge 28. The steering handlebar 3 is equipped with a right-left pair of hand guards 5 and a right-left pair of rearview mirrors 4. A cowl C that covers the front part of the vehicle body is disposed in front of the steering handlebar 3. The cowl C includes a front cowl 9 that covers the outer circumference of a headlamp 12 and holds a windshield screen 7, and a right-left pair of front lateral cowls 11 that covers on the outer sides in the vehicle width direction of the front cowl 9. The windshield screen 7 is equipped with a right-left pair of deflectors 8 that is fastened together with the windshield screen 7. A measuring instrument 6 is disposed behind the windshield screen 7.

A right-left pair of front flasher lamps 10 are mounted on the side part of the front cowl 9. A right-left pair of air guide members 50 (the shaded parts in the drawings) as deflectors according to the present invention is disposed behind the front flasher lamps 10. A guard member 80 for protecting the vehicle body is disposed at the front and sides of the cowl C. The guard member 80 formed of a pipe member is equipped with a right-left pair of auxiliary lamps 27. A front fender 14 that covers the front wheel WF from above is mounted on the front forks 13.

A right-left pair of passenger footpegs 18 is attached to the lower part of the rear frame F3. Pannier cases 22 are mounted on the right and left sides of the rear cowl 25. A taillamp device 24, rear flasher lamps 23, and a rear fender 21 are provided at the rear end of the rear cowl 25. A skid plate 15 for protecting the power unit P is disposed at the lower part of the power unit P.

Figure 2:
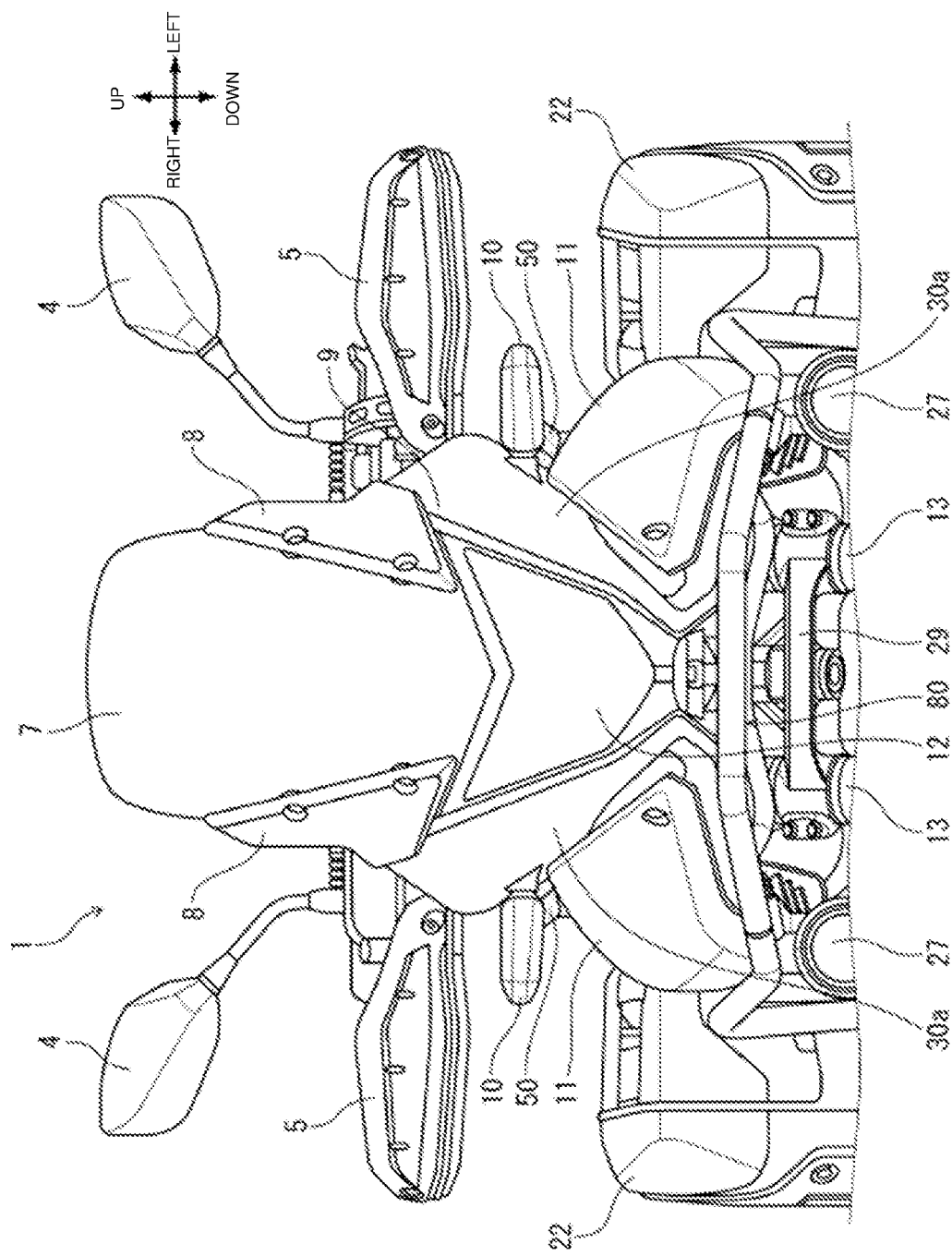
FIG. 2 is an enlarged partial front view of the motorcycle.
Figure 3:
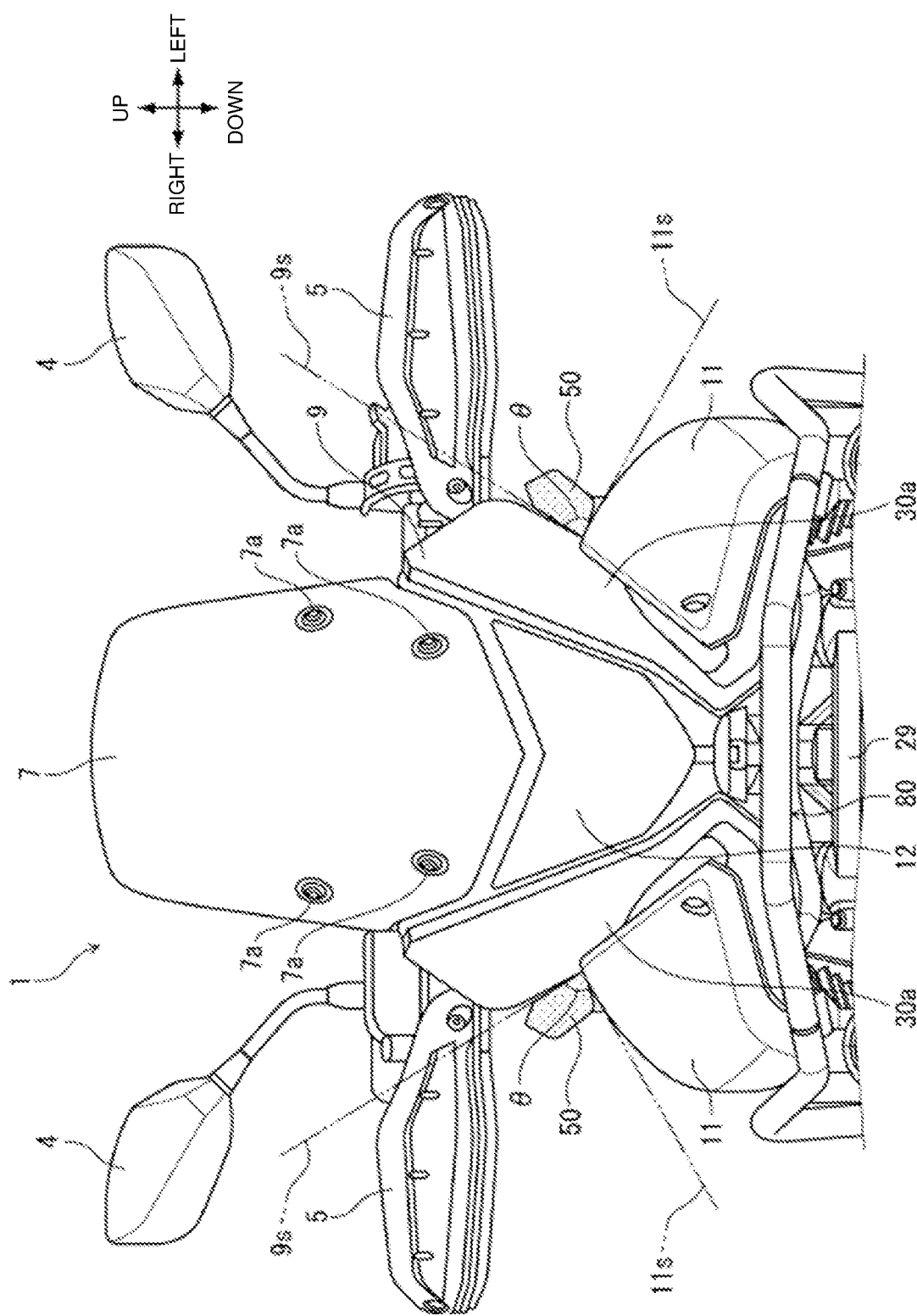
FIG. 3 is an enlarged partial front view of the motorcycle corresponding to FIG. 2 without front flasher lamps.

FIG. 2 is an enlarged partial front view of the motorcycle 1. FIG. 3 is an enlarged partial front view of the motorcycle 1 corresponding to FIG. 2 without the front flasher lamps 10. In FIG. 3, in addition to the front flasher lamps 10, the pannier cases 22 and the deflectors 8 fastened together by a fastening screw 7a of the windshield screen 7 are also not shown.

The outer surface of the front cowl 9 includes inclined surfaces 30a that are each inclined greater inward in the vehicle width direction as they become lower in height. As seen in a front view, the air guide members 50 behind the front flasher lamps 10 are each positioned at the site where the contour of the front cowl 9 and the contour of the corresponding front lateral cowl 11 cross each other at a predetermined angle. In other words, the air guide members 50 are each disposed at the site where a tangent 9s in contact with the outer shape of the front cowl 9 and a tangent 11s in contact with the outer shape of the corresponding front lateral cowl 11 cross each other at a predetermined angle. While the tangent 9s and the tangent 11s form an acute angle θ in the present embodiment, they may form an obtuse angle. Thus, the air guide members 50 being disposed in the passage of the airflow flowing along the shape of the cowl reduces the airflow's impact on the rider. The sites where the contour of the front cowl 9 and the contours of the front lateral cowls 11 cross each other at a predetermined angle are positioned below the steering handlebar 3 and at the front of the body of the rider.

Figure 4:
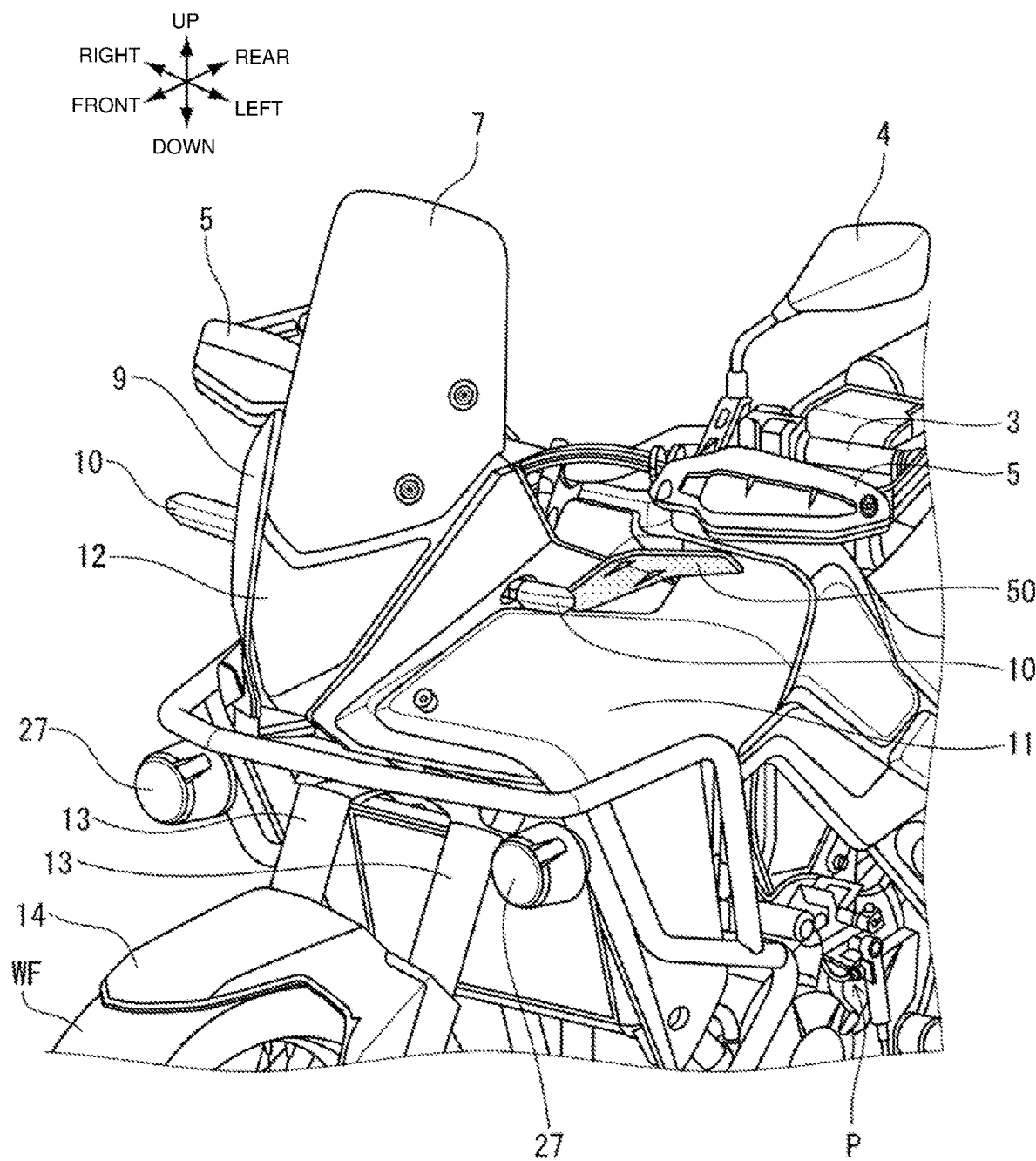
FIG. 4 is an enlarged partial perspective view of the motorcycle as seen from the left front side.
Figure 5:
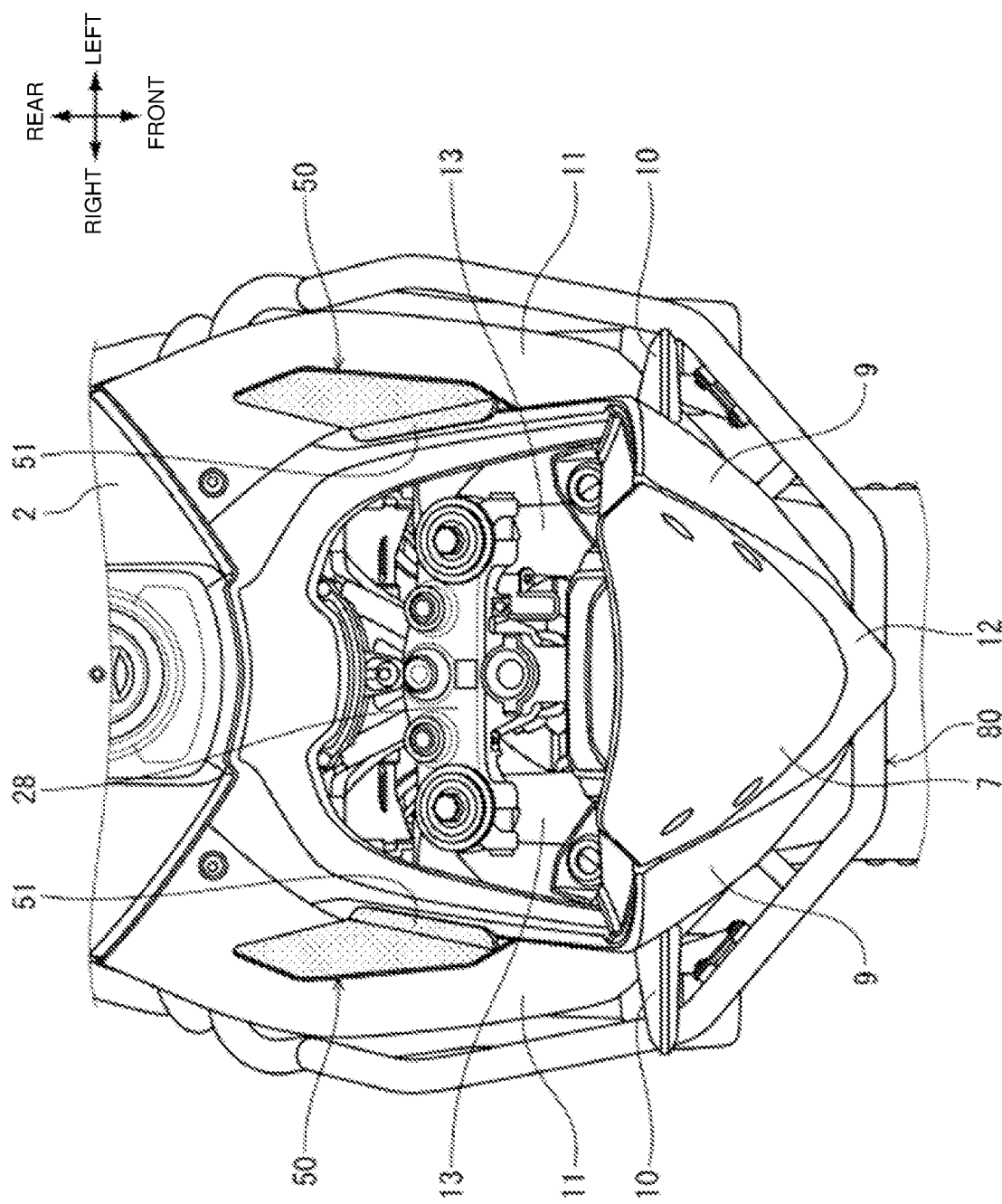
FIG. 5 is an enlarged partial plan view of the motorcycle without a steering handlebar.

FIG. 4 is an enlarged partial perspective view of the motorcycle 1 as seen from the left front side. FIG. 5 is an enlarged partial plan view of the motorcycle 1 without the steering handlebar 3. The air guide members 50 are bonded to the front cowl 9 behind the front flasher lamps 10. On the inner surface of each of the air guide members 50, a rising part 51 that becomes in contact with the upper edge of the front cowl 9 is provided. The rising parts 51 facilitate positioning the upper side of the air guide members 50.

Figure 6:
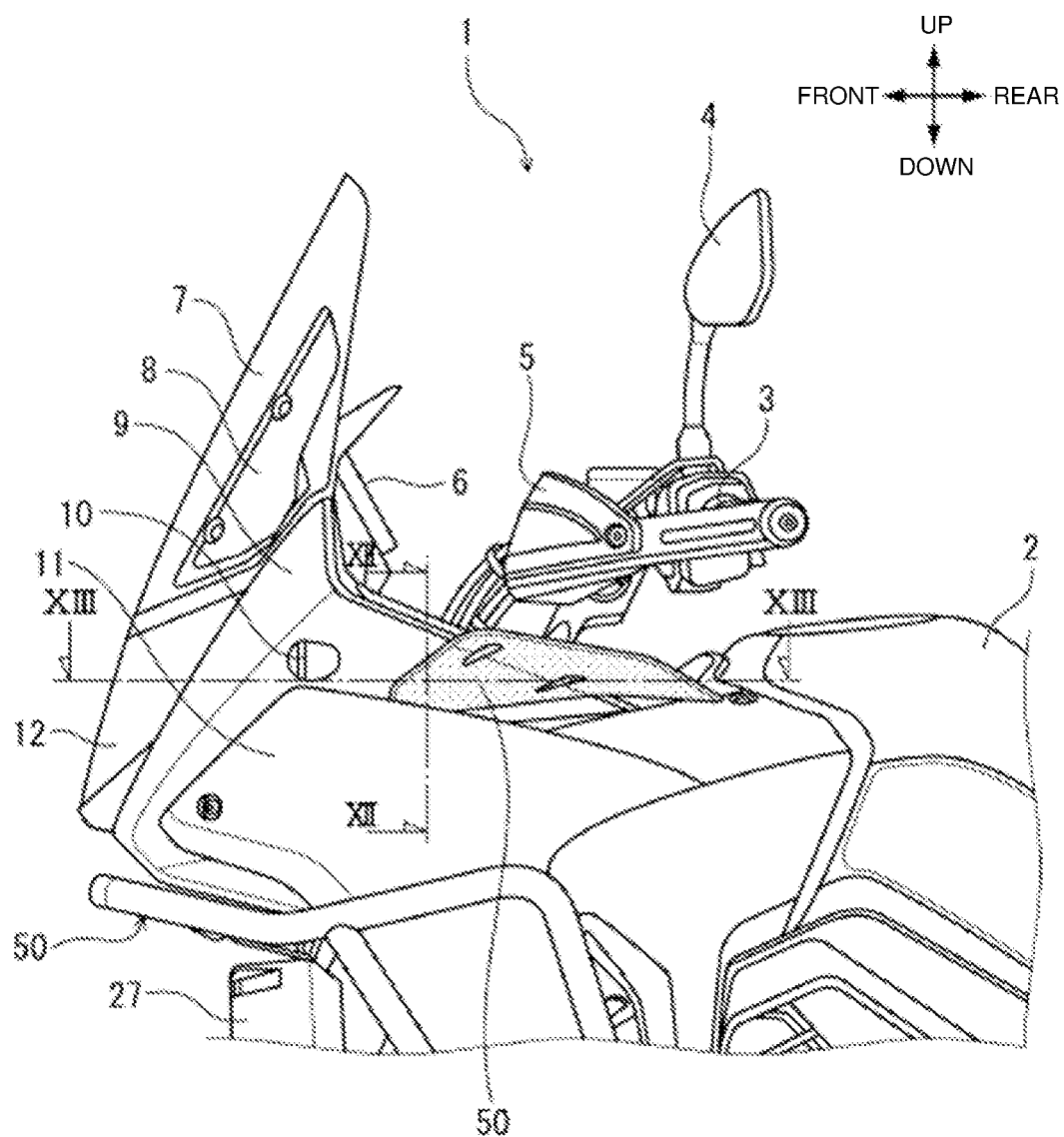
FIG. 6 is an enlarged partial view corresponding to FIG. 1.
Figure 7:
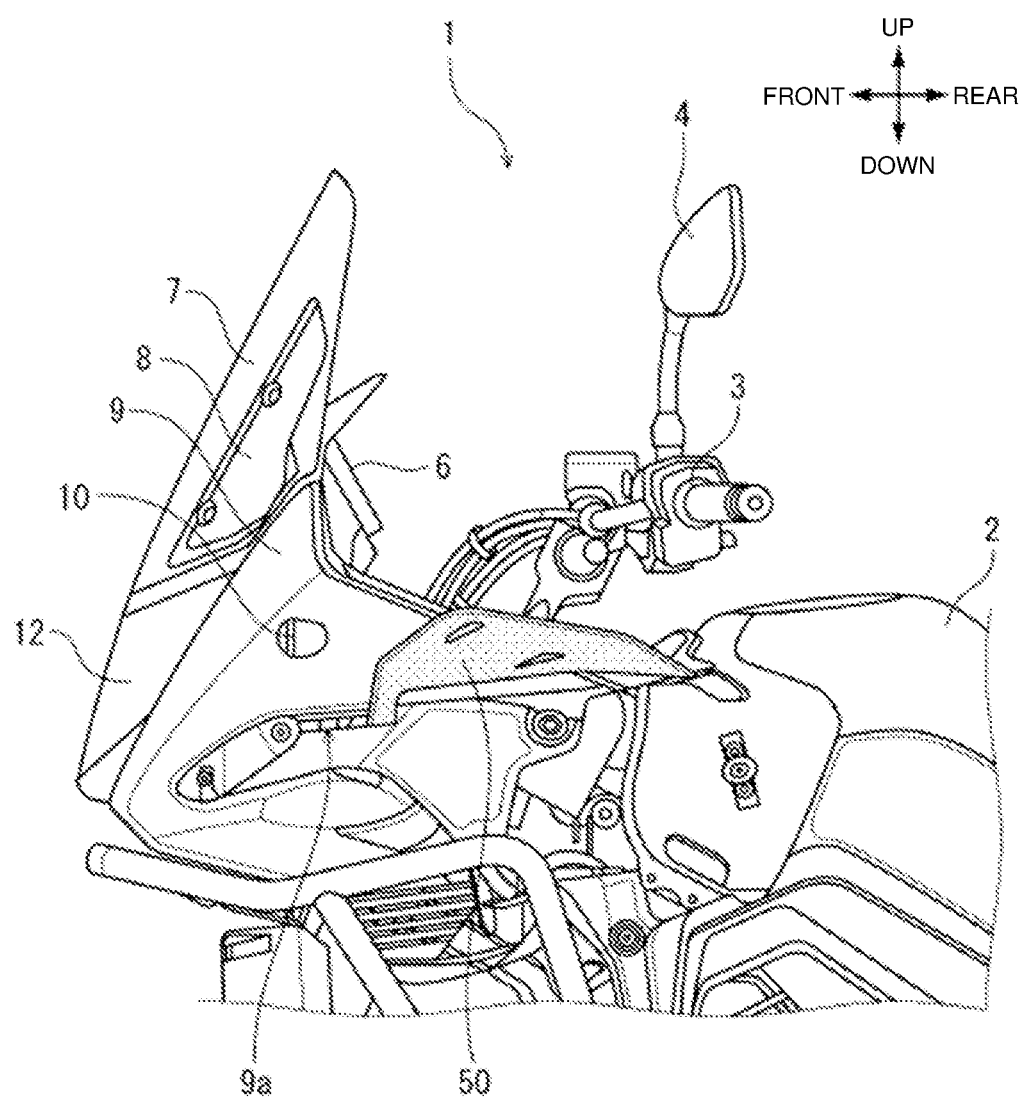
FIG. 7 is a left-side view corresponding to FIG. 6 without a front lateral cowl.

FIG. 6 is an enlarged partial view corresponding to FIG. 1. FIG. 7 is a left-side view corresponding to FIG. 6 without the front lateral cowls 11. The front lateral cowls 11 are large-size components that cover from the lateral parts of the front cowl 9 to the frontward lateral parts of the fuel tank 2. The air guide members 50 have their front ends inserted into openings 9a formed at the front cowl 9, respectively. Thus, the air guide members 50 have their front sides positioned.

Figure 8:
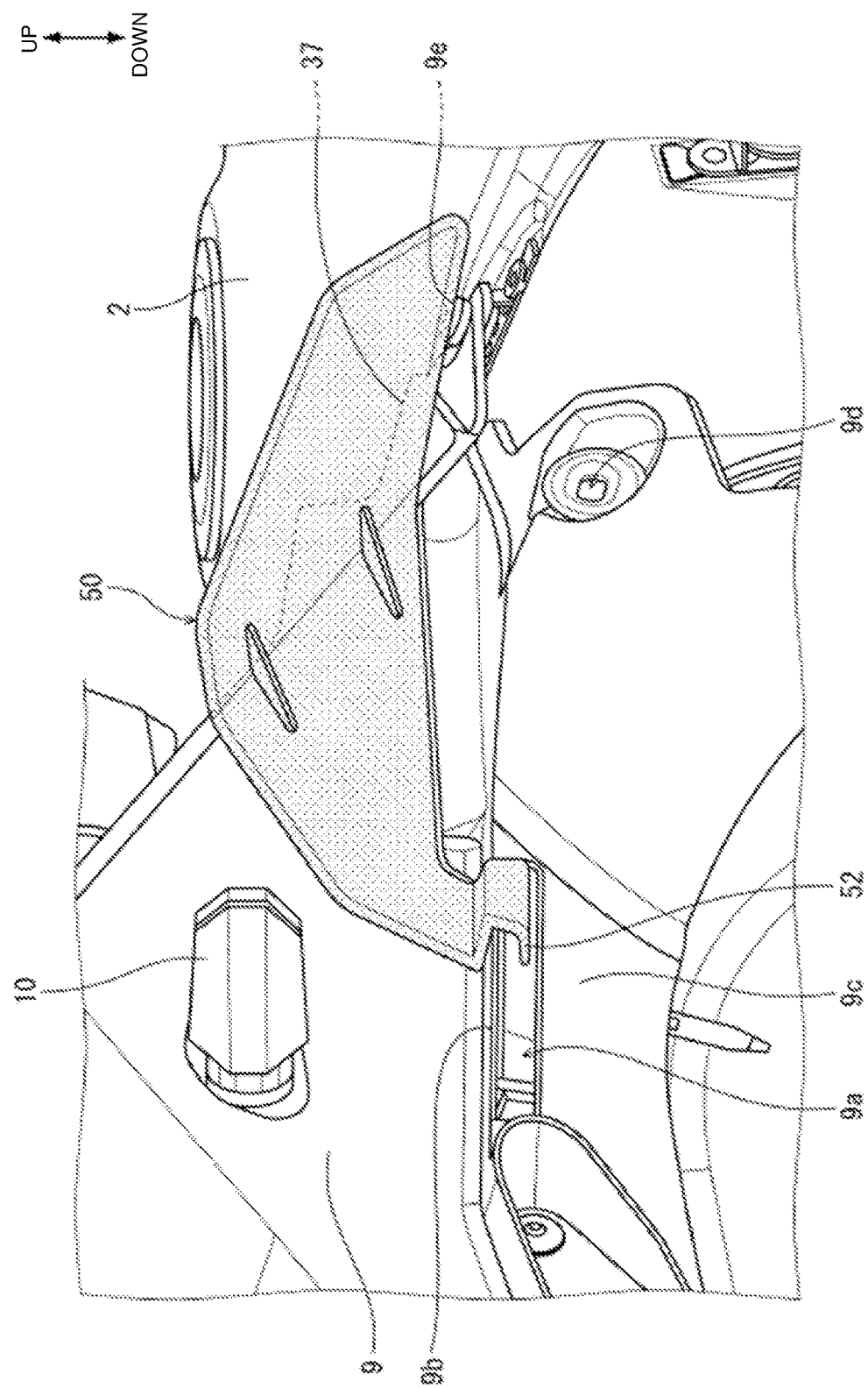
FIG. 8 is a perspective view of an air guide member being mounted.

FIG. 8 is a perspective view showing the air guide member 50 being mounted. At its front end, the air guide member 50 includes a plate-like support part 52, which is inserted into the horizontally elongated opening 9a formed at the front cowl 9. By the support part 52 and the opening 9a being covered with the front lateral cowl 11, the air guide member 50 is easily positioned and held. The air guide member 50 being held between the front cowl 9 and the front lateral cowl 11 realizes easy assembly. The support part 52 not being exposed to the outside improves the appearance.

The front cowl 9 includes bent parts 9b that extend outward in the vehicle width direction. The bent parts 9b each include a downward extending part 9c that extends from its outer end in the vehicle width direction downward along the back surface of the corresponding front lateral cowl 11. The opening 9a is formed at the downward extending part 9c. This structure reliably provides the space for mounting the air guide members 50 and facilitates positioning the air guide members 50.

In the front cowl 9, grommets 9d for holding the front lateral cowls 11 are embedded. An upper cover 37 that covers the upper surface of the front cowl 9 has its rear end fixed to the fuel tank 2 together with the upper end of the front cowl 9 by fixing members 9e.

Figure 9:
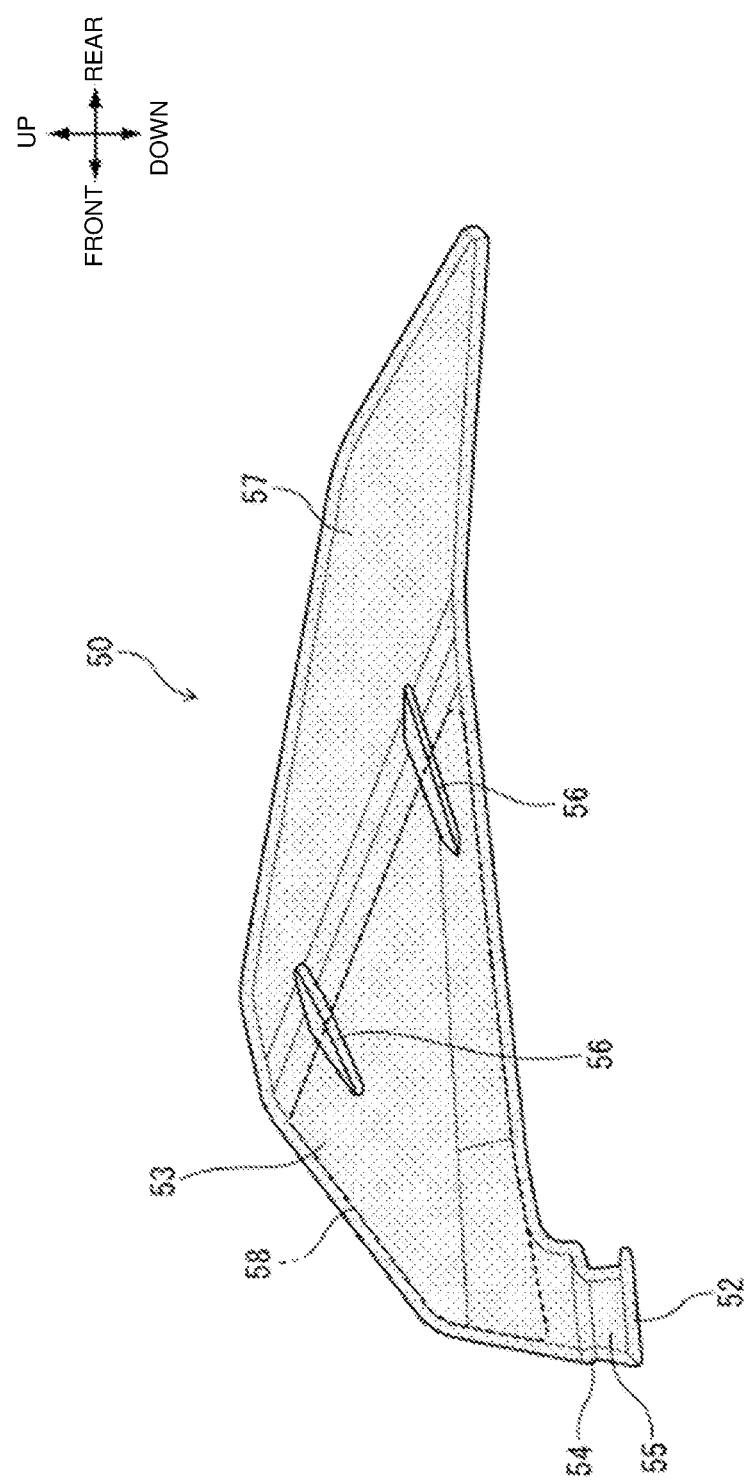
FIG. 9 is a left-side view of the air guide member.
Figure 10:
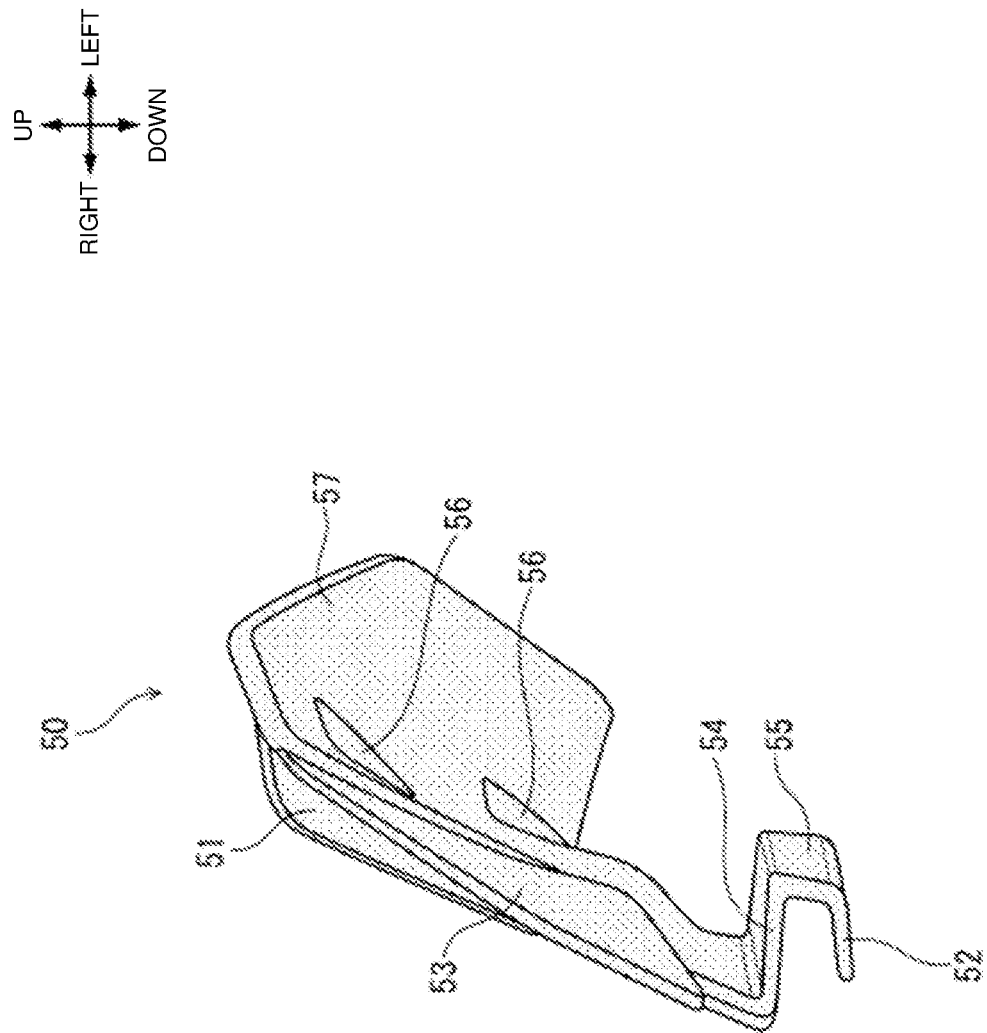
FIG. 10 is a front view of the air guide member.
Figure 11:
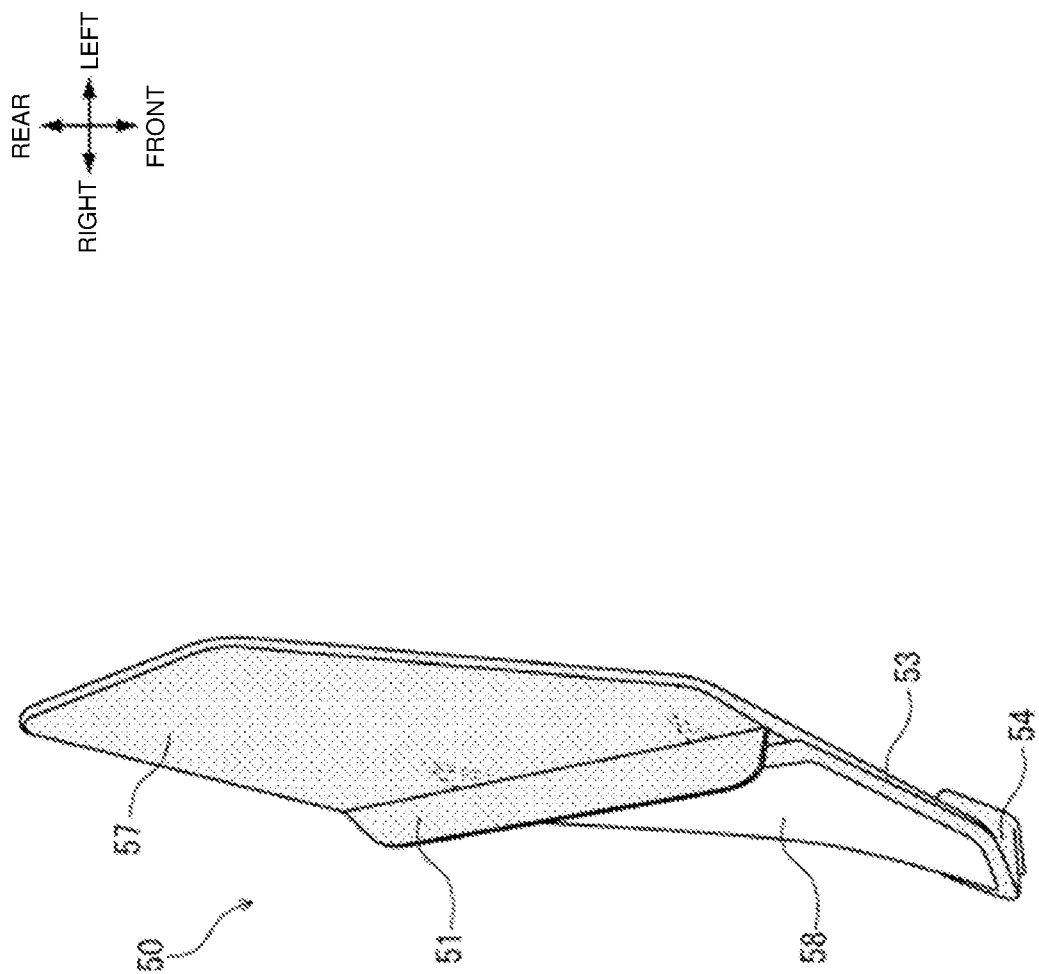
FIG. 11 is a plan view of the air guide member.

FIG. 9 is a left-side view of the air guide member 50. FIG. 10 is a front view of the air guide member 50. FIG. 11 is a plan view of the air guide member 50. While FIGS. 9 to 11 show the left air guide member 50, the right air guide member 50 which is symmetric has the same structure.

The air guide member 50 includes a base part 53 that includes a bonding surface 58 bonded to the front cowl 9, and a rearward extending part 57 that extends rearward continuously from the base part 53. On the boundary between the base part 53 and the rearward extending part 57, two ribs 56 are provided to enhance the strength of the air guide member 50 and smooth the airflow. On the surface of the air guide member 50 on the inner side in the vehicle width direction, the rising part 51 that becomes in contact with the upper edge of the front cowl 9 to carry out positioning is provided.

The support part 52 inserted into the opening 9a of the front cowl 9 is provided at the portion that projects downward from the front end lower part of the base part 53. In more detail, an outward extending part 54 extends from the front end lower part of the base part 53 outward in the vehicle width direction. The lower part 55 extends downward from the end of the outward extending part 54. The support part 52 extends inward in the vehicle width direction from the end of the lower part 55. Thus, the air guide member 50 has the shape that conforms to the front cowl 9 and the front lateral cowl 11, which further facilitates positioning the air guide member 50.

In the air guide member 50 made of colored transparent synthetic resin or the like, at least the base part 53 and the rising part 51 have their outer surfaces textured. The texturing makes the bonding surface 58 unobtrusive and improves the appearance of the air guide member 50. Any sites in addition to the base part 53 and the rising part 51 may be textured. The base part 53 and the rising part 51 may have their inner surfaces textured.

Figure 12:
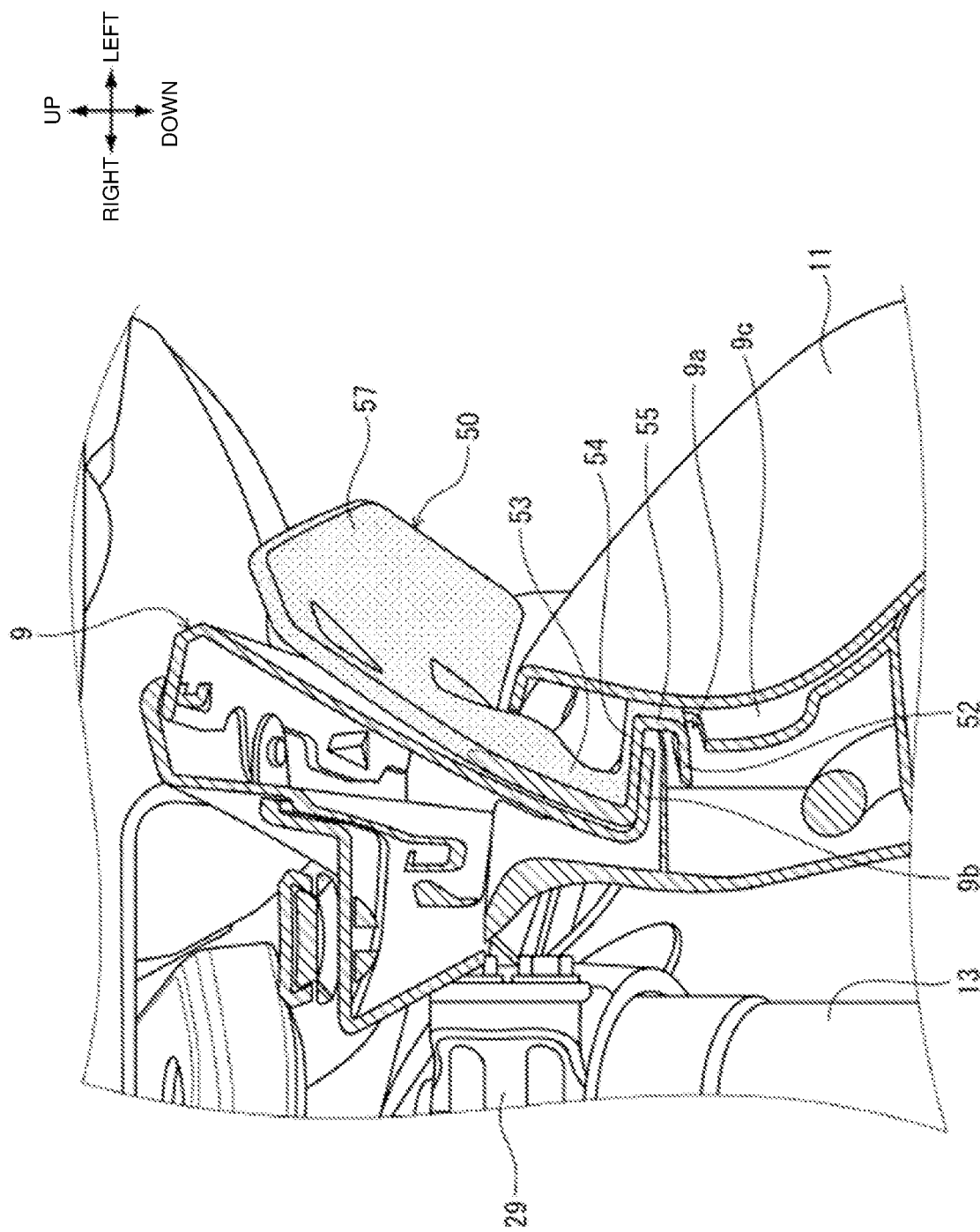
FIG. 12 is a cross-sectional view taken along line XII-XII in FIG. 6.

FIG. 12 is a cross-sectional view taken along line XII-XII in FIG. 6. The outward extending part 54 of the air guide member 50 extends outward in the vehicle width direction along the bent part 9b of the front cowl 9. The lower part 55 of the air guide member 50 extends downward along the back surface of the front lateral cowl 11. The vehicle widthwise dimension of the support part 52 is set to be longer than the distance between the front cowl 9 and the front lateral cowl 11. Thus, unless the front lateral cowl 11 is removed, the support part 52 will not come off from the opening 9a, and the front cowl 9 and the front lateral cowl 11 surely hold the air guide member 50.

Figure 13:
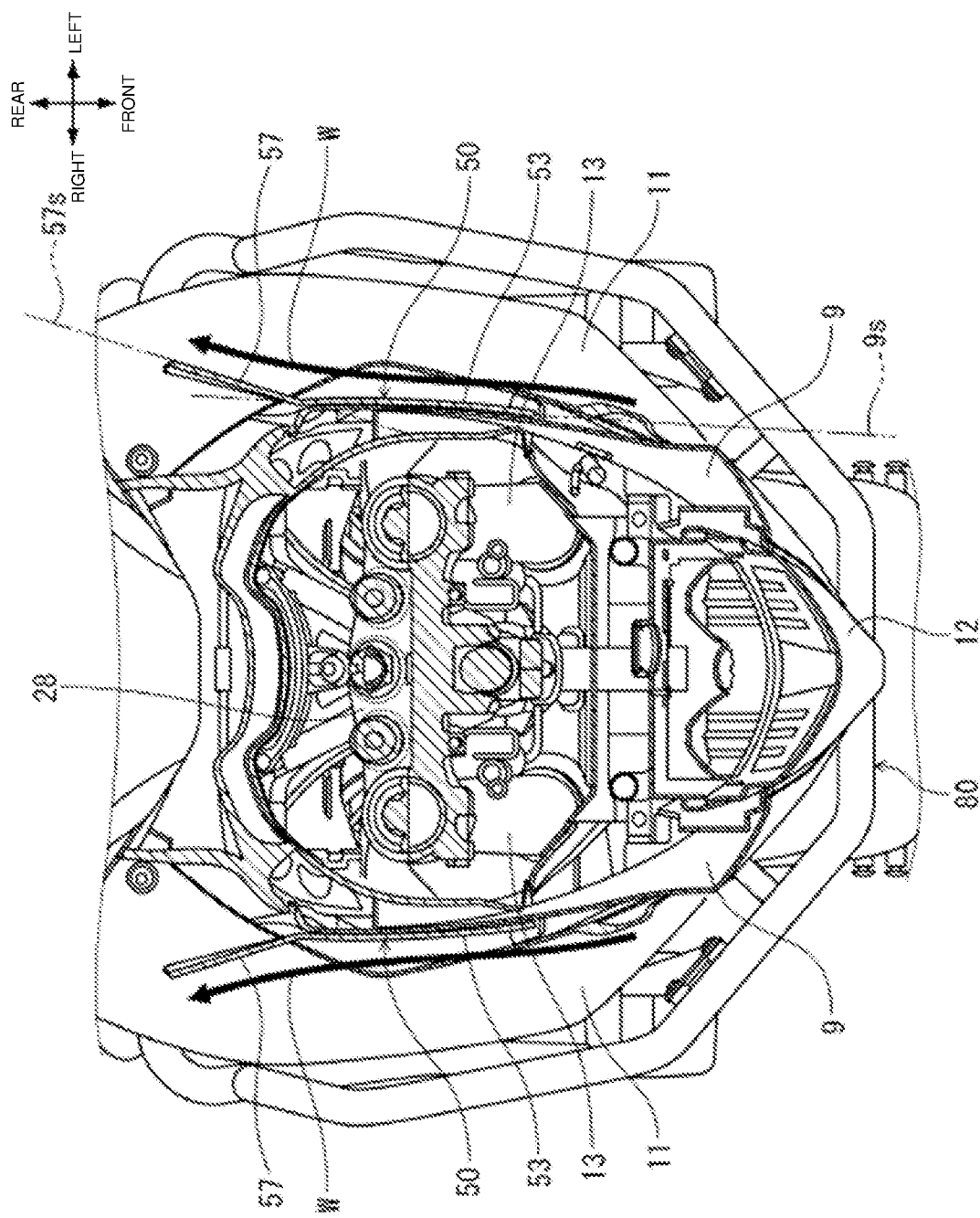
FIG. 13 is a cross-sectional view taken along line XIII-XIII in FIG. 6.

FIG. 13 is a cross-sectional view taken along line XIII-XIII in FIG. 6. The front cowl 9 is inclined to widen outward in the vehicle width direction toward its rear. The air guide member 50 includes a rearward extending part 57 that extends rearward than the rear end of the front cowl 9. The rearward extending part 57 is inclined outward in the vehicle width direction greater than the front cowl 9 is. More specifically, a tangent 57s along the rearward extending part 57 is designed to have a greater inclination than the inclination of the tangent 9s along the front cowl 9. This structure guides an airflow W flowing along the front cowl 9 increasingly outward in the vehicle width direction and reduces the airflow's impact on the rider.

Figure 14:
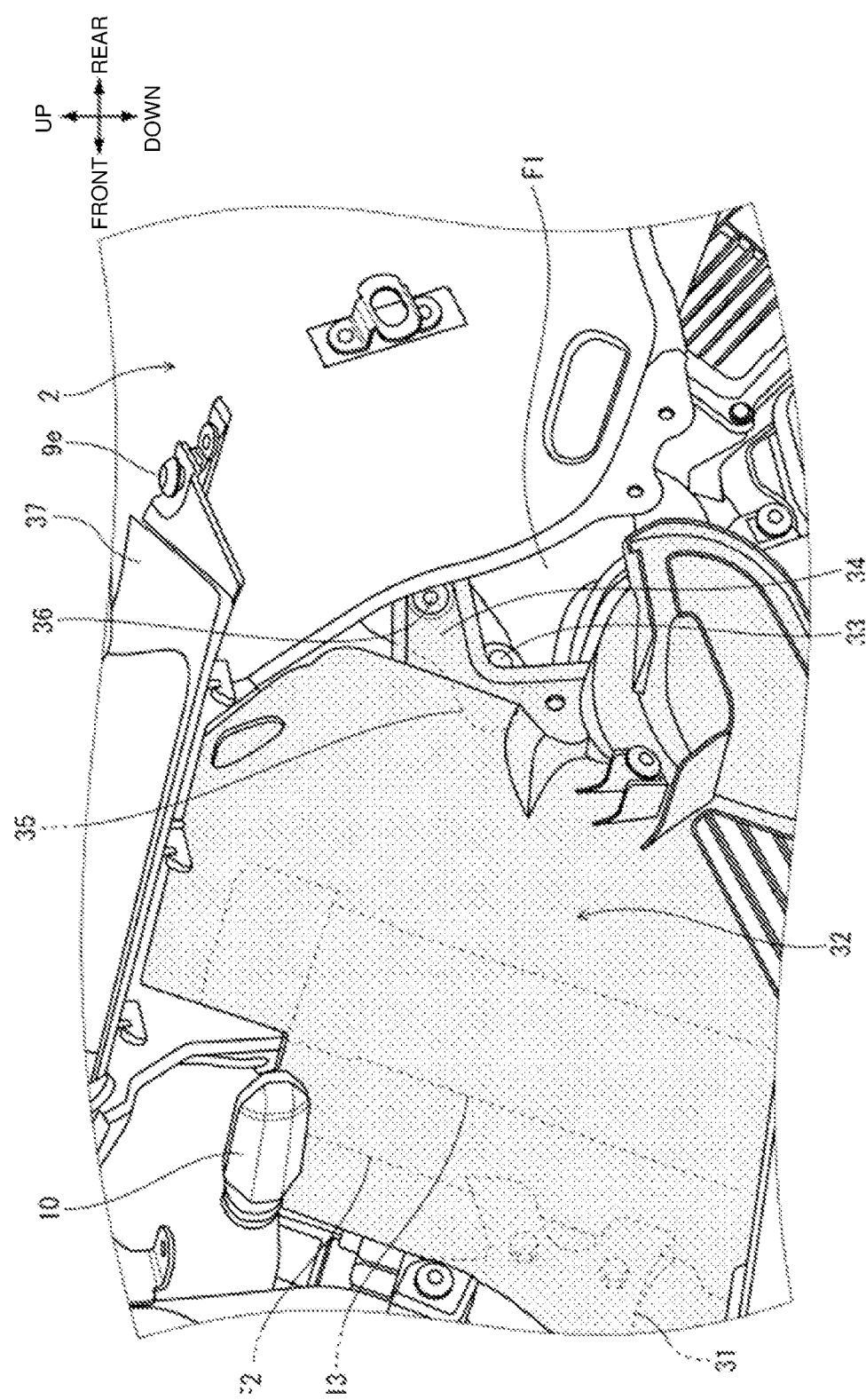
FIG. 14 is an enlarged partial perspective view of the motorcycle without a front cowl as seen from the left front side.

FIG. 14 is an enlarged partial perspective view of the motorcycle 1 without the front cowl 9 as seen from the left front side. A cowl stay 31 is mounted at the front part of the head pipe F2. The upper cover 37 has its rear end held on the fuel tank 2 by the fixing members 9e. A fuel tank retaining stay 35 provided at the front of the fuel tank 2 is fixed to the main frame F1 by a fastening member 33. On the other hand, an inner cowl retaining stay 34 provided at the rear part of an inner cowl 32 is fixed to the fuel tank retaining stay 35 by a fastening member 36. In this structure, the inner cowl 32 does not cover the fuel tank retaining stay 35. Therefore, by removing the fastening members 33, 36, the user can lift the fuel tank 2 upward without the necessity of removing the inner cowl 32. Thus, the structure improves maintainability while holding the inner cowl 32 with high strength.

Figure 15:
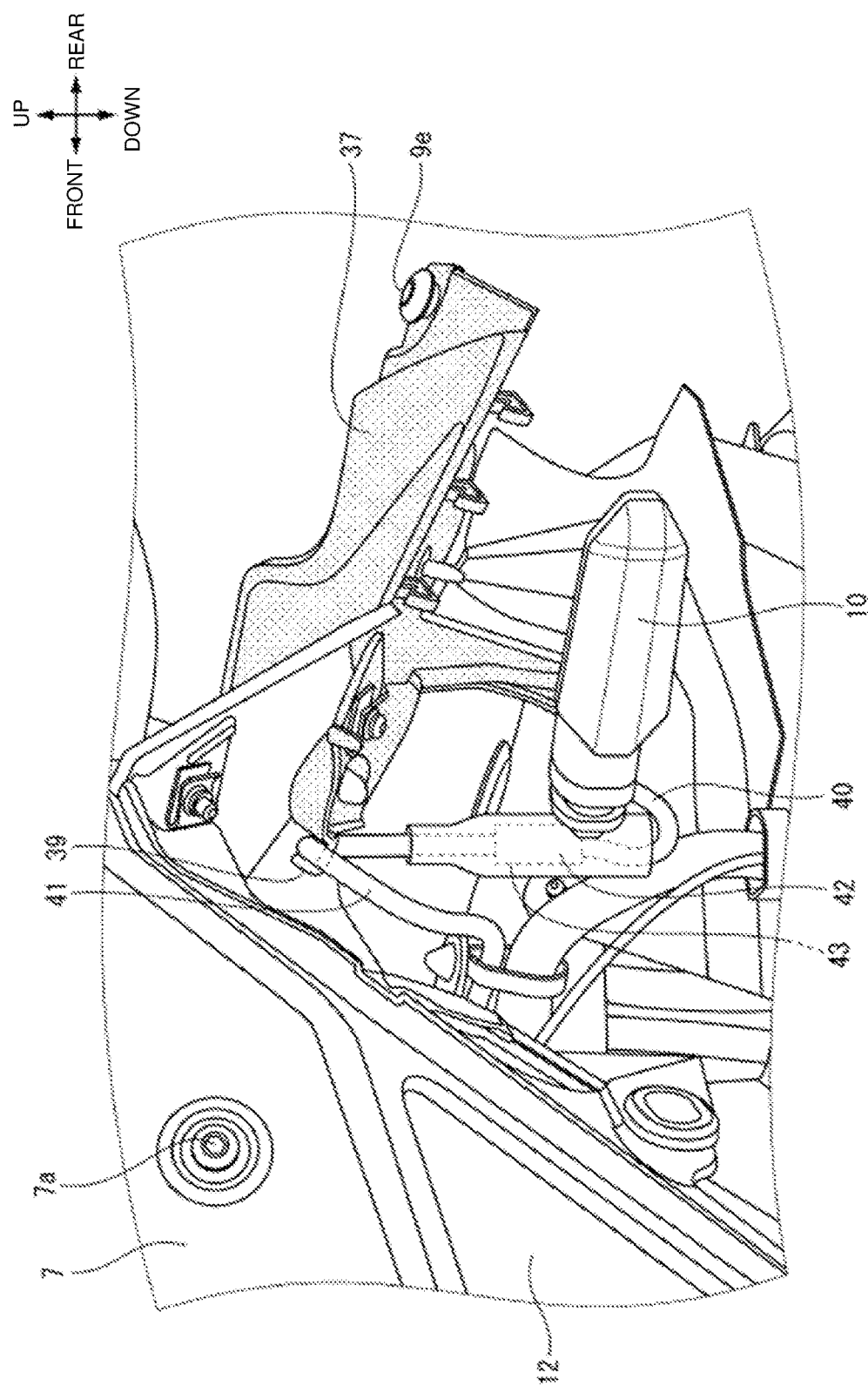
FIG. 15 is a perspective view corresponding to FIG. 13 without an inner cowl.

FIG. 15 is a perspective view corresponding to FIG. 13 without the inner cowl 32. A hook-like harness holding part 39 for suspending a wire 41 for the corresponding front flasher lamp 10 is provided at the front end of the upper cover 38. The harness holding part 39 holds a coupler 43 and a cover 42, which connect between a wire 40 and the wire 41, to be oriented in the top-bottom direction. Thus, the harness holding part 39 drains any water from inside the cowl and on the harness.

As described above, in the air guide member mounting structure of the present invention, the cowl C includes the front cowl 9 that covers the outer circumference of the headlamp 12 and the front lateral cowls 11 that cover on the outer sides in the vehicle width direction of the front cowl 9. The air guide members 50 each have the support part 52 held between the front cowl 9 and the corresponding front lateral cowl 11. Thus, each air guide member 50 being held between the front cowl 9 and the corresponding front lateral cowl 11 realizes easy assembly. The support part 52 not being exposed to the outside improves the appearance.

The mode of the motorcycle, the shape or structure of the front cowl or the front lateral cowl, the shape or structure of the air guide member, and the shape of the support part or the opening are not specified to the embodiment, and various changes may be made. The air guide member mounting structure of the present invention is not limited to a motorcycle and is applicable to a saddled three- or four-wheel vehicle.

REFERENCE SIGNS LIST

1: motorcycle (saddled vehicle)
7: windshield screen
9: front cowl
9a: opening
9b: bent part
9c: downward extending part
11: front lateral cowl
12: headlamp
50: air guide member
52: support part
53: base part
54: outward extending part
55: lower part
57: rearward extending part
C: cowl

What is claimed is:

1. A saddled vehicle comprising:
a cowl that covers a front part of the saddled vehicle;
a windshield screen disposed at an upper part of the cowl; and
an air guide member separately from the windshield screen mounted on the cowl, wherein
the cowl includes
a front cowl that covers an outer circumference of a headlamp, the front cowl being inclined to widen outward in a vehicle width direction toward a vehicle rearward, and
a front lateral cowl that is separated from the front cowl in the vehicle width direction and covers the front cowl from an outer side in the vehicle width direction, and
the air guide member includes:
a base part that extends along a lateral side of the front cowl,
a support part covered with the front lateral cowl and held between the front cowl and the front lateral cowl, and
a rearward extending part that extends further rearward than a rear end of the base part, wherein the rearward extending part is inclined outward in the vehicle width direction greater than the front cowl is.

2. The saddled vehicle according to claim 1, wherein
the front cowl has an opening,
the support part is inserted into the opening from an outer side in the vehicle width direction, and
the opening and the support part are covered with the front lateral cowl.

3. The saddled vehicle according to claim 2, wherein a vehicle widthwise dimension of the support part is longer than a distance between the front cowl and the front lateral cowl.

4. The saddled vehicle according to claim 2, wherein the air guide member is disposed at a site where a contour of the front cowl and a contour of the front lateral cowl cross each other at a predetermined angle in a front view of the saddled vehicle.

5. The saddled vehicle according to claim 1, wherein:
the front cowl includes, at its portion covered with the front lateral cowl, a bent part that extends outward in the vehicle width direction, and
a vehicle widthwise dimension of the support part is longer than a distance between the front cowl and an outer end of the bent part in the vehicle width direction.

6. The saddled vehicle according to claim 5, wherein the air guide member is disposed at a site where a contour of the front cowl and a contour of the front lateral cowl cross each other at a predetermined angle in a front view of the saddled vehicle.

7. The saddled vehicle according to claim 1, wherein the air guide member is disposed at a site where a contour of the front cowl and a contour of the front lateral cowl cross each other at a predetermined angle in a front view of the saddled vehicle.

8. The saddled vehicle according to claim 1, wherein the air guide member is a left-side air guide member and the saddled vehicle further includes a right side air guide member wherein the right side air guide member is held between the front cowl and the front lateral cowl.

9. The saddled vehicle according to claim 1, wherein
the air guide member includes a rising part that extends inward in the vehicle width direction on an inner surface of the air guide member and becomes in contact with an upper edge of the front cowl.

10. A saddled vehicle comprising:
a cowl that covers a front part of the saddled vehicle;
a windshield screen disposed at an upper part of the cowl; and
an air guide member separately from the windshield screen mounted on the cowl, wherein:
the cowl includes:
a front cowl that covers an outer circumference of a headlamp; and
a front lateral cowl that covers an outer side in a vehicle width direction of the front cowl, the air guide member includes a support part held between the front cowl and the front lateral cowl, the front cowl has an opening, the support part is inserted into the opening from an outer side in the vehicle width direction, the opening and the support part are covered with the front lateral cowl, the front cowl includes, at its portion covered with the front lateral cowl, a bent part that extends outward in the vehicle width direction, the bent part includes a downward extending part that extends downward along a back surface of the front lateral cowl from its outer end in the vehicle width direction, and the opening is provided at the downward extending part.

11. The saddled vehicle according to claim 10, wherein the air guide member includes:
   a base part that extends along a surface of the front cowl;
   an outward extending part that extends outward in the vehicle width direction along the bent part; and
   a lower part that extends downward from an end of the outward extending part along a back surface of the front lateral cowl, wherein
   the support part extends inward in the vehicle width direction from a lower end of the lower part.

12. The saddled vehicle according to claim 11, wherein an inner surface of the base part of the air guide member is bonded to an outer surface of the front cowl.

13. The saddled vehicle according to claim 12, wherein the base part is textured.

14. The saddled vehicle according to claim 11, wherein the air guide member is disposed at a site where a contour of the front cowl and a contour of the front lateral cowl cross each other at a predetermined angle in a front view of the saddled vehicle.

15. The saddled vehicle according to claim 11, wherein
   the front cowl is inclined to widen outward in the vehicle width direction toward its rear,
   the air guide member includes a rearward extending part that extends further rearward than a rear end of the front cowl, and
   the rearward extending part is inclined outward in the vehicle width direction greater than the front cowl is.

16. The saddled vehicle according to claim 12, wherein
   an outer surface of the front cowl includes an inclined surface that is inclined inward in the vehicle width direction toward downward, and
   the air guide member is in contact with the inclined surface.

17. The saddled vehicle according to claim 10, wherein the air guide member is disposed at a site where a contour of the front cowl and a contour of the front lateral cowl cross each other at a predetermined angle in a front view of the saddled vehicle.

18. The saddled vehicle according to claim 10, wherein
   the front cowl is inclined to widen outward in the vehicle width direction toward its rear,
   the air guide member includes a rearward extending part that extends further rearward than a rear end of the front cowl, and
   the rearward extending part is inclined outward in the vehicle width direction greater than the front cowl is.

* * * * *